United States Patent
Cho

(10) Patent No.: US 9,172,832 B2
(45) Date of Patent: Oct. 27, 2015

(54) IMAGE FORMING APPARATUS AND METHOD OF CONTROLLING IMAGE FORMING APPARATUS

(71) Applicant: SAMSUNG ELECTRONICS CO., LTD., Suwon-si, Gyeonggi-do (KR)

(72) Inventor: Tae-gyun Cho, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/144,819

(22) Filed: Dec. 31, 2013

(65) Prior Publication Data

US 2014/0198343 A1    Jul. 17, 2014

(30) Foreign Application Priority Data

Jan. 17, 2013    (KR) .................. 10-2013-0005389

(51) Int. Cl.
| | |
|---|---|
| *G06F 3/12* | (2006.01) |
| *H04N 1/00* | (2006.01) |
| *G06F 3/048* | (2013.01) |
| *G03G 15/00* | (2006.01) |
| *G06K 15/00* | (2006.01) |

(52) U.S. Cl.
CPC ............. *H04N 1/0048* (2013.01); *G03G 15/50* (2013.01); *G03G 15/502* (2013.01); *G06F 3/048* (2013.01); *G06F 3/1205* (2013.01); *G06F 3/1255* (2013.01); *G06F 3/1258* (2013.01); *G06F 3/1284* (2013.01); *H04N 1/00411* (2013.01); *H04N 1/00416* (2013.01); *H04N 1/00472* (2013.01); *H04N 1/00482* (2013.01); *H04N 2201/0094* (2013.01)

(58) Field of Classification Search
CPC ... G06F 3/1255; G06F 3/1258; H04N 1/0048; H04N 1/00472
See application file for complete search history.

(56) References Cited

U.S. PATENT DOCUMENTS

| | | | | |
|---|---|---|---|---|
| 6,452,607 | B1 * | 9/2002 | Livingston | ...................... 715/705 |
| 2004/0252329 | A1 * | 12/2004 | Sorenson | ...................... 358/1.15 |
| 2006/0262351 | A1 * | 11/2006 | Kim | .............................. 358/1.16 |
| 2009/0268241 | A1 * | 10/2009 | Choi et al. | ..................... 358/1.15 |
| 2011/0283226 | A1 * | 11/2011 | Basson et al. | ................. 715/794 |
| 2012/0212776 | A1 * | 8/2012 | Murata | ......................... 358/1.15 |

FOREIGN PATENT DOCUMENTS

EP          2161913 A1    3/2010

OTHER PUBLICATIONS

Extended European Search Report mailed Dec. 19, 2014 in related European Application No. 14150269.0.

* cited by examiner

*Primary Examiner* — Dov Popovici

(74) *Attorney, Agent, or Firm* — Staas & Halsey LLP

(57) ABSTRACT

An image forming apparatus and a method of controlling the image forming apparatus are provided. The method includes detecting a conflicting option that is impossible to be set simultaneously with a plurality of options selected for a job of the image forming apparatus, reflecting the detected conflicting option to display an option setting screen for the job of the image forming apparatus, and if a conflicting option is selected on the displayed option setting screen, displaying an option list user interface (UI) window in an area of the displayed option setting screen, wherein the option list UI window includes a replaceable option that replaces an option that is impossible to be set simultaneously with the conflicting option.

18 Claims, 12 Drawing Sheets

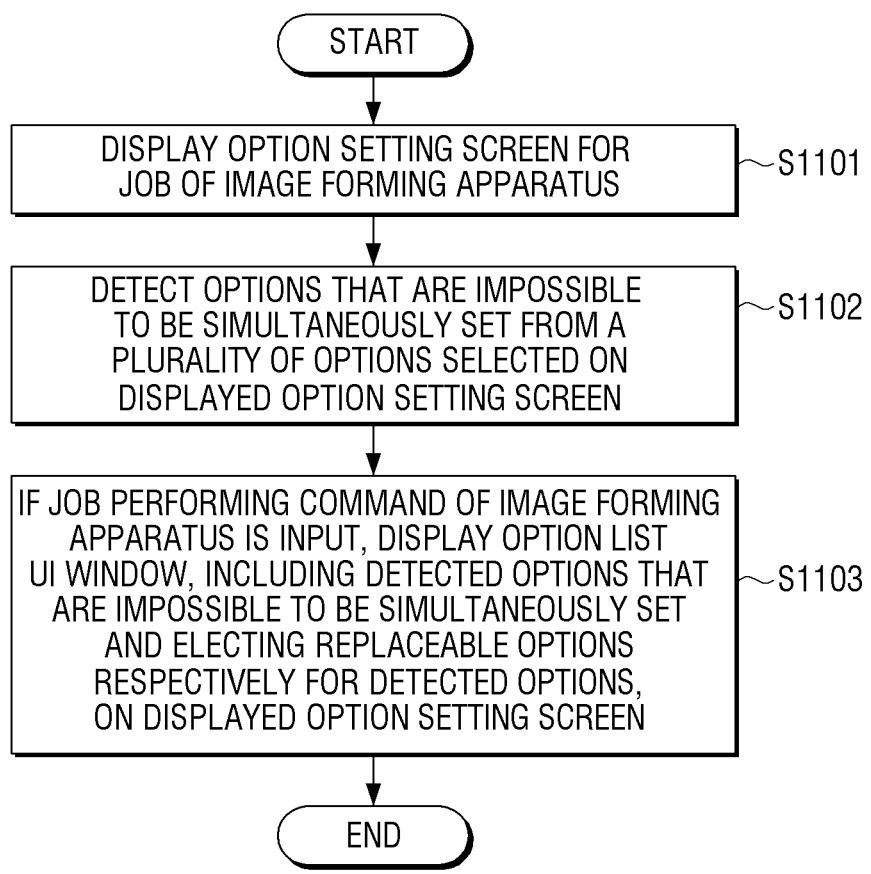

IMAGE FORMING APPARATUS AND METHOD OF CONTROLLING IMAGE FORMING APPARATUS

CROSS-REFERENCE TO RELATED APPLICATIONS

This application is related to, and claims priority to, Korean Patent Application No. 10-2013-0005389, filed on Jan. 17, 2013, in the Korean Intellectual Property Office, the disclosure of which is incorporated herein by reference.

BACKGROUND

1. Field

Exemplary embodiments of the present invention relate to an image forming apparatus and a method of controlling the image forming apparatus, and more particularly, to an image forming apparatus that easily solves conflicting options that are impossible to be simultaneously set among a plurality of options selected for a job of the image forming apparatus, and a method of controlling the image forming apparatus.

2. Description of the Related Art

An image forming apparatus refers to an apparatus that prints printing data on a recording medium like a copier, a printer, a fax machine, and a multifunction peripheral (MFP) that may functions as more than one device.

A MFP provides various functions such as copying, faxing, scanning, printing, etc. and may provide a screen for selecting various options related to performance of the various functions.

However, the selected options may include a-conflicting options that are impossible to be simultaneously set. The MFP is not capable of performing a function as an image forming apparatus. Therefore, if there are conflicting options that are impossible to be simultaneously set in a plurality of options selected for a job of the image forming apparatus, a method of appropriately solving this is required.

SUMMARY

Additional aspects and/or advantages will be set forth in part in the description which follows and, in part, will be apparent from the description, or may be learned by practice of the invention.

An exemplary embodiment of the present invention may address the above problems and/or disadvantages, and/or may address other disadvantages not described above.

According to an exemplary embodiment an image forming apparatus is provided that displays an option list user interface (UI) window including a replaceable option capable of replacing a conflicting option in an area of an option setting screen and a method of controlling the image forming apparatus.

According to an aspect of an exemplary embodiment, a method of controlling an image forming apparatus is provided. The method may include displaying an option setting screen for a job of the image forming apparatus, selecting at least one option on the option setting screen, and if the selected at least one option is a conflicting option that is impossible to be set simultaneously with a plurality of options that are pre-selected for the job of the image forming apparatus, displaying an option list user interface (UI) window in an area of the displayed option setting screen, wherein the option list UI window includes a replaceable option that is to replace the pre-selected option conflicting with the conflicting option.

The method may include detecting a conflicting option that is impossible to be set simultaneously with the plurality of options pre-selected for the job of the image forming apparatus, wherein the displaying of the option setting screen comprises differentially displaying the detected conflicting option from the plurality of options displayed on the option setting screen.

The option list UI window may display the pre-selected option conflicting with the conflicting option and the replaceable option replacing the pre-selected option together. The replaceable option may display an identifier indicating the replaceable option.

The option list UI window may be displayed in the area of the option setting screen displayed in a pop-up window form.

The method may include if the replaceable option is selected on the option list UI window, setting the selected replaceable option and the conflicting option as options related to the job of the image forming apparatus.

The method may include displaying a screen for selecting a conflicting option processing mode of the image forming apparatus. The conflicting option processing mode may include a first mode for processing a conflicting option based on a selected order, a second mode for processing the conflicting option according to priorities given to options, a third mode for processing the conflicting option according to a user selection, and a fourth mode for processing the conflicting option by using the second or third mode based on a preset standard.

If the selected conflicting option processing mode is the first mode, the method may include if a conflicting option that is impossible to be set simultaneously with the plurality of options pre-selected for the job of the image forming apparatus is detected, blocking option setting of the detected conflicting option from the plurality of options displayed on the option setting screen; and if the conflicting option is selected, displaying information about the pre-selected option conflicting with the conflicting option.

If the selected conflicting option processing mode is the second mode, the method may include if a conflicting option that is impossible to be set simultaneously with the plurality of options pre-selected for the job of the image forming apparatus is detected, comparing a priority given to the detected conflicting option with a priority given to the pre-selected option conflicting with the detected conflicting option; and automatically setting an option having a high priority as an option related to the job of the image forming apparatus based on a result of the priority comparison.

If the selected conflicting option processing mode is the third mode, the method may be performed.

If the selected conflicting option processing mode is the fourth mode, the method may include if a conflicting option that is impossible to be set simultaneously with the plurality of options pre-selected for the job of the image forming apparatus is detected, determining whether the pre-selected option conflicting with the detected conflicting option is a default option; and if it is determined that the pre-selected option is the default option, operating the image forming apparatus in the second mode, and if it is determined that the pre-selected option is not the default option, operating the image forming apparatus in the third mode.

According to an aspect of the exemplary embodiments, an image forming apparatus includes a display device that displays an option setting screen for a job of the image forming apparatus, an input device that receives a user input for selecting at least one option on the option setting screen, and a controller that, if the selected at least one option is a conflicting option that is impossible to be set simultaneously with a plurality of options pre-selected for the job of the image forming, controls the display device to display an option list UI window in an area of the displayed option setting screen, wherein the option list UI window includes a replaceable option that replaces the pre-selected option conflicting with the conflicting option.

The image forming apparatus may include a storage device that stores information about options that are impossible to be set simultaneously with the plurality of options pre-selected for the job of the image forming apparatus, wherein the controller controls the display device to detect a conflicting option that is impossible to be set simultaneously with the plurality of options pre-selected for the job of the image forming apparatus, by using the information stored in the storage device and differentially display the detected conflicting option from the plurality of options displayed on the option setting screen.

The option list UI window may display the pre-selected option conflicting with the conflicting option and the replaceable option replacing the pre-selected option together. The replaceable option may display an identifier indicating the replaceable option.

The option list UI window may be displayed in the area of the option setting screen displayed in a pop-up window form.

If the replaceable option is selected on the option list UI window, the controller may set the selected replaceable option and the conflicting option as options related to the job of the image forming apparatus.

The display device may display a screen for selecting a conflicting option processing mode of the image forming apparatus. The conflicting option processing mode may include a first mode for processing a conflicting option based on a selected order, a second mode for processing the conflicting option according to priorities given to options, a third mode for processing the conflicting option according to a user selection, and a fourth mode for processing the conflicting option by using the second or third mode based on a preset standard.

If the selected conflicting option processing mode is the first mode, and a conflicting option that is impossible to be set simultaneously with the plurality of options pre-selected for the job of the image forming apparatus is detected, the controller controls the display device to block option setting of the detected conflicting option from the plurality of options displayed on the option setting screen, and if the conflicting option is selected, display information about the pre-selected option conflicting with the conflicting option.

If the selected conflicting option processing mode is the second mode, and a conflicting option that is impossible to be set simultaneously with the plurality of options pre-selected for the job of the image forming apparatus is detected, the controller may compare a priority given to the detected conflicting option with a priority given to the pre-selected option conflicting with the detected conflicting option and automatically set an option having a high priority as an option related to the job of the image forming apparatus based on a result of the priority comparison.

If the selected conflicting option processing mode is the fourth mode, and a conflicting option that is impossible to be set simultaneously with the plurality of options pre-selected for the job of the image forming apparatus is detected, the controller may control to determine whether the pre-selected option conflicting with the detected conflicting option is a default option, if it is determined that the pre-selected option is the default option, operate the image forming apparatus in the second mode, and, if it is determined that the pre-selected option is not the default option, operate the image forming apparatus in the third mode.

According to an aspect of the exemplary embodiments, there is provided a method of controlling an image forming apparatus. The method may include displaying an option setting screen for a job of the image forming apparatus, detecting options that are impossible to be set simultaneously with a plurality of selected options, and if a job performing command of the image forming apparatus is input, displaying an option list UI window in an area of the displayed option setting screen, wherein the option list UI window includes the detected options that are impossible to be simultaneously set and selects replaceable options that respectively replace the detected options.

BRIEF DESCRIPTION OF THE DRAWINGS

The above and/or other aspects will be more apparent by describing certain exemplary embodiments with reference to the accompanying drawings, in which:

FIG. 11 is a flowchart illustrating a method of controlling an image forming apparatus according to an exemplary embodiment of the present invention.

DETAILED DESCRIPTION

Figure 1:
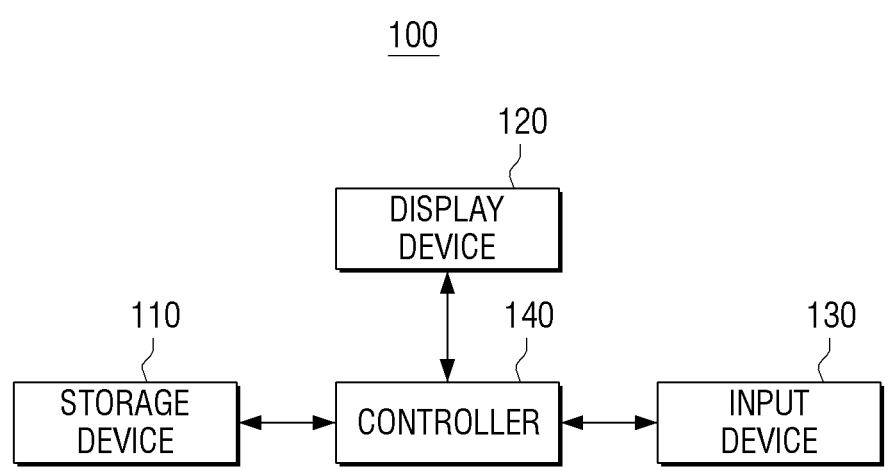
FIG. 1 is a block diagram illustrating an image forming apparatus according to an exemplary embodiment of the present invention.

Exemplary embodiments are described in detail with reference to the accompanying drawings.

In the following description, the same drawing reference numerals are used for the same elements in different drawings. The matters defined in the description, such as detailed construction and elements, are provided to assist in a comprehensive understanding of the exemplary embodiments.

FIG. 1 is a block diagram illustrating an image forming apparatus 100 according to an exemplary embodiment of the present invention. Referring to FIG. 1, the image forming apparatus 100 includes a storage device 110, a display device 120, an input device 130, and a controller 140.

The storage device 110 stores various types of programs and data necessary for driving the image forming apparatus 100. The storage device 110 stores information about options that are impossible to be simultaneously set with a plurality of options for a job of the image forming apparatus 100. The storage device 110 stores information about at least one conflicting option conflicting with at least one of a plurality of options of the job of the image forming apparatus 100, information about a priority option between the plurality of options and the conflicting option conflicting with the at least one of the plurality of options, and information about whether the plurality of options are default options. The storage device 110 may store information as illustrated in Table 1 below.

TABLE 1

| Option | Conflicting Option 1 | Priority | Default Option | Conflicting Option 2 | Priority |
|---|---|---|---|---|---|
| JPEG Auto Fit | Mono Book Copy | JPEG Auto Fit | YES NO | Edge Erase | Auto Fit |
| ... | ... | ... | ... | ... | ... |

The display device 120 may display a screen.

The display device 120 displays an option setting screen for the job of the image forming apparatus 100. A job of the image forming apparatus 100 may include printing, copying, faxing, and scanning jobs, etc. The option setting screen may be a screen that is to set options for the printing, copying, faxing, and scanning jobs, etc.

The display device 120 displays an option list user interface (UI) window, including a replaceable option replacing an option that is impossible to be set simultaneously with the conflicting option, in an area of the displayed option setting screen. An option list UI window may be displayed in a pop-up window form in the area of the displayed option setting screen.

The display device 120 displays a screen that is to select a conflicting option processing module of the image forming apparatus 100.

The display device 110 may be at least one of a liquid crystal display (LCD), a thin film transistor-liquid crystal display (TFT-LCD), an organic light-emitting diode (OLED), a flexible display, a 3-dimensional (3D) display, and a transparent display.

The input device 130 receives a user input for the image forming apparatus 100. The input device 130 may be at least one of a touch sensor that receives a touch input for the display device 120, an proximity sensor that receives a motion that approaching the display device 120 without directly contacting a surface of the display device 120, and a microphone that receives a voice input of a user. An input device, such as a mouse, a keyboard, a remote controller, or the like, may be combined with the input device 130 and may be combined with a display apparatus such as the display device 120 to realize the input device 130.

The input device 130 may receive various types of user inputs such as a touch input, a motion input, a voice input, etc.

The controller 140 may control an overall operation of the image forming apparatus 100. The controller 140 may control all, or some of, the storage device 110, the display device 120, and the input device 130.

The controller 140 may control the overall operation of the image forming apparatus 100 to perform an operation corresponding to the selected conflicting option processing mode. A screen for selecting the conflicting option processing mode may be displayed as illustrated in FIG. 3.

Figure 3:
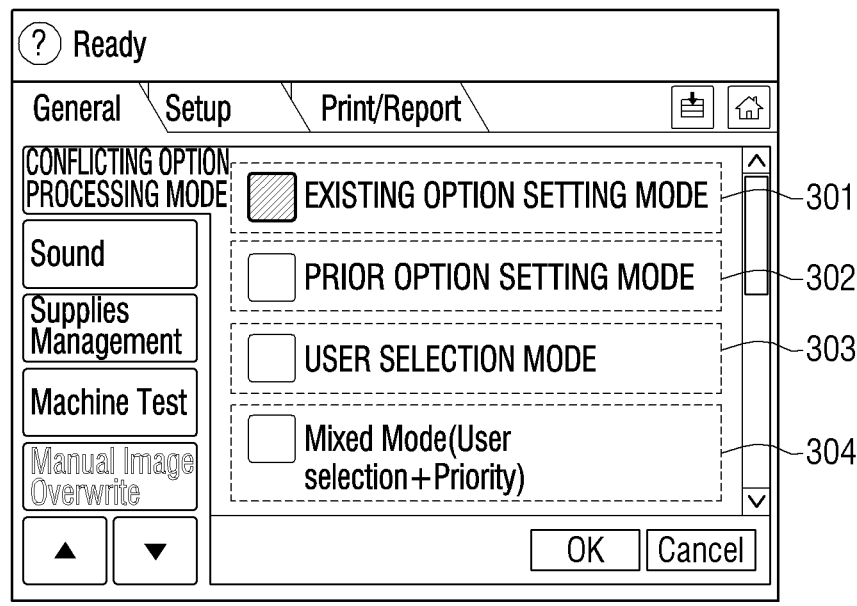
FIG. 3 illustrates a user interface (UI) displaying a screen for selecting a conflicting option processing mode according to an exemplary embodiment of the present invention.

As illustrated in FIG. 3, the conflict option processing mode includes a first mode (an existing option setting mode) 301, which is to process a conflicting option based on the selected order, a second mode (a prior option setting mode) 302, which is to process the conflicting option according to priorities given to options, a third mode (a user selection mode) 303, which is to process the conflicting option according to a user selection, and a fourth mode (a mixed mode) 304, which is to process the conflicting option by using the second or third mode according to a preset standard. If a user selects a particular mode on the screen of FIG. 3, the controller 140 controls the overall operation of the image forming apparatus 100 to perform an operation corresponding to the selected conflicting option processing mode.

An exemplary operation according to each mode are disclosed.

<#1: First Mode>

According to an exemplary first mode, a user selects an option, which is to be used for the job of the image forming apparatus 100, on an option setting screen for the job of the image forming apparatus 100 displayed on the display device 120.

The controller 140 detects a plurality of selected options and conflicting options that are impossible to be simultaneously set, by using the information stored in the storage device 110. If a conflicting option is detected, the controller 140 controls to block an option setting of the detected conflicting option from a plurality of options displayed on the option setting screen of the display device 120. The controller 140 controls the display device 120 to distinguish and display the detected conflicting option from the plurality of options displayed on the option setting screen.

It the user selects the conflicting option distinguished and displayed on the option setting screen, the controller 140 controls the display device 120 to display information about the conflicting option and an option that is impossible to be simultaneously set.

If the user wants to select the conflicting option as an option for the job of the image forming apparatus 100 in the first mode, the controller 140 changes the conflicting option and the option that is impossible to be simultaneously set into a conflicting option and an option that is possible to be simultaneously set, and selects an option for the job of the image forming apparatus 100.

An exemplary first mode is described with reference to FIGS. 4A and 4B.

Figure 4A:
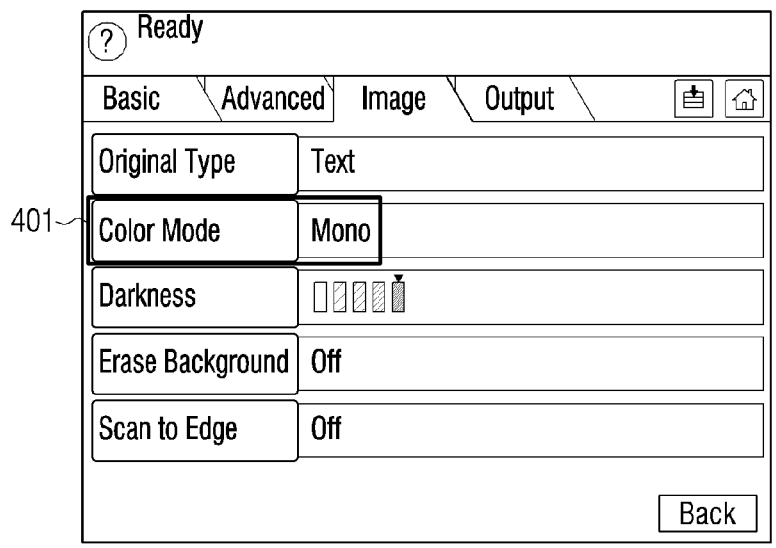
FIGS. 4A and 4B illustrate a UI displaying an operation of an image forming apparatus if a first mode for processing a conflicting option based on a selected order is selected, according to an exemplary embodiment of the present invention.
Figure 4B:
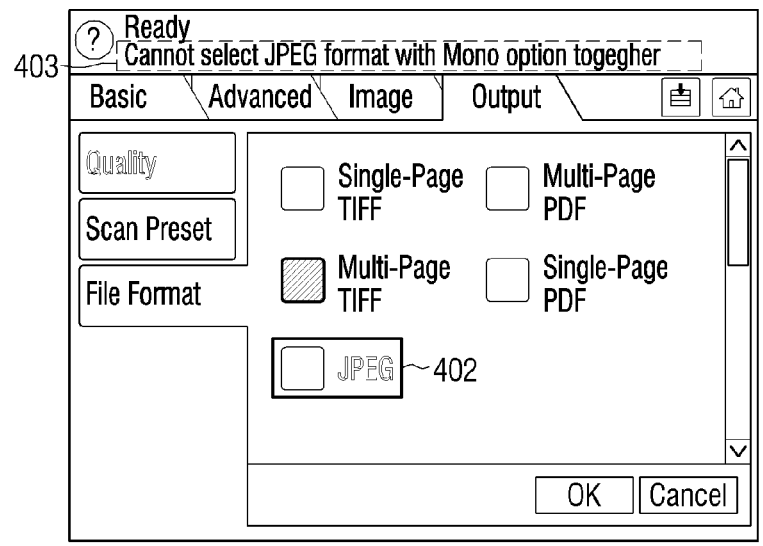

FIGS. 4A and 4B illustrate a UI displaying an operation of the image forming apparatus 100 if a first mode for processing a conflicting option based on a selected order is selected, according to an exemplary embodiment of the present invention.

The user selects a mono option 401 of a color mode on an option setting screen as illustrated in FIG. 4A. The controller 140 detects an option "JPEG" of an option "File Format" as a conflicting option that is impossible to be set simultaneously with an option "Mono" of an option "Color Mode" by using the information stored in the storage device 110. The controller 140 controls to block an option setting of the detected conflicting option "JPEG" of the option "File Format" from a plurality of options displayed on the option setting screen. The controller 140 displays the display device 120 to differentially display the conflicting option "JPEG" 402 (e.g., a disable state) of the option "File Format" as illustrated in FIG. 4B.

If the user selects the conflicting option "JPEG" 402 of the option "File Format" differentially displayed on the option setting screen, the controller 140 controls the display device 120 to display information "Cannot select JPEG format with Mono option together" 403 about the conflicting option and the option that is impossible to be simultaneously set.

If the user wants to select the conflicting option "JPEG" 402 of the option "File Format" as an option for the job of the image forming apparatus 100, the user moves onto the option setting screen as illustrated in FIG. 4A, changes a conflicting option "JPEG" and the option "Mono" 401 of the "Color mode" that is impossible to be simultaneously set into a conflicting option "JPEG" of the option "File Format" and an option that is possible to be simultaneously set, and selects the conflicting option "JPEG" of the option "File Format" as the option for the job of the image forming apparatus 100.

<#2: Second Mode>

An option to be used for the job of the image forming apparatus 100 may be selected on the option setting screen of the job of the image forming apparatus 100. Selections of a plurality of options for the job of the image forming apparatus 100 may be performed through a user input on the option setting screen. An option that is set to a default option may be automatically selected as an option for the job of the image forming apparatus 100.

The controller detects a plurality of selected portions and a conflicting option that is impossible to be simultaneously set, by using the information stored in the storage device 110. If a conflicting option is detected, the controller 140 controls the display device 120 to display the detected conflicting option differentially from the plurality of options displayed on the option setting screen of the display device 120.

If the user selects the conflicting option that is differentially displayed, the controller 140 compares a priority given to the detected conflicting option with a priority give to an option that is impossible to be set simultaneously with the detected conflicting option.

The controller 140 automatically sets an option having a high priority based on the priority comparison result as an option related to the job of the image forming apparatus 100.

If the option related to the job of the image forming apparatus 100 is automatically set to the option having the high priority, the controller 140 controls the display device 120 to display information about the automatic setting.

if the user selects the conflicting option that is differentially displayed, the controller 140 may performs an operation corresponding to the above-described mode but is not limited thereto. According to an exemplary embodiment, an option having a high priority based on a priority comparison result may be automatically set to an option related to the job of the image forming apparatus 100 without an operation of differentially displaying a detected conflicting option and an operation of selecting the detected conflicting option.

According to the second mode, if conflicts occur between a plurality of selected options, a control of the user may be excluded to solve the conflicts between the options.

The second mode is described with reference to FIG. 5.

Figure 5A:
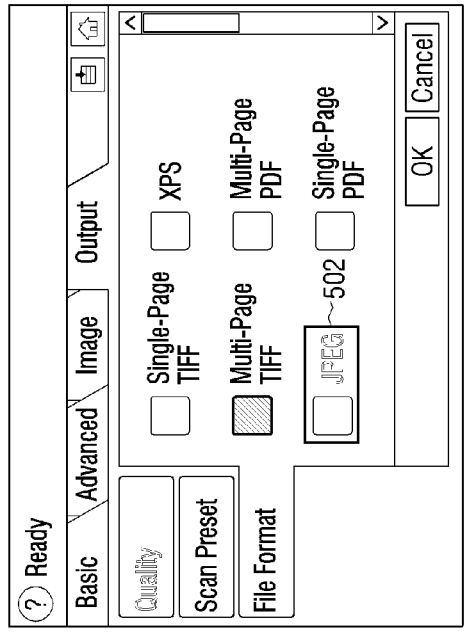
FIGS. 5A-5C illustrate a UI displaying an operation of the image forming apparatus if a second mode for processing a conflicting option according to priorities given to options is selected, according to an exemplary embodiment of the present invention.
Figure 5C:
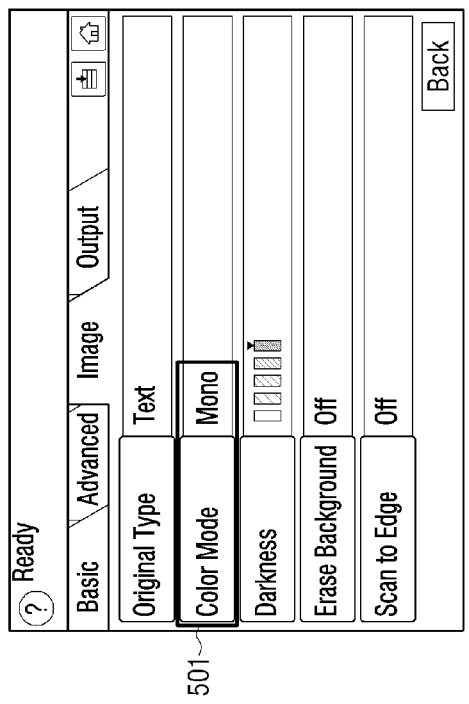
Figure 5B:
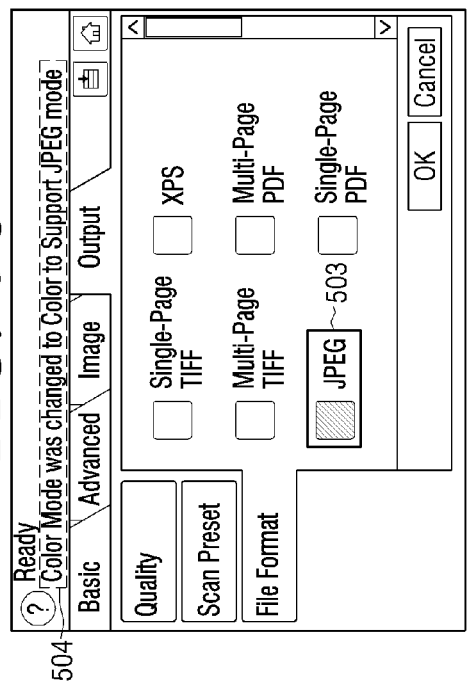

FIGS. 5A-5C illustrate a UI displaying an operation of the image forming apparatus 100 if the second mode for processing a conflicting option according to priorities given to options, according to an exemplary embodiment of the present invention.

The user selects an option 501 "Mono" of an option "Color Mode" on an option setting screen as illustrated in FIG. 5A.

The controller 140 detects an option "JPEG" of an option "File Format" as a conflicting option that is impossible to be set simultaneously with the option "Mono" of the option "Color Mode" by using the information stored in the storage device 110. The controller 140 controls the display device 120 to differentially display the conflicting option "JPEG" 502 of the option "File Format" as illustrated in FIG. 5B.

If the user selects the conflicting option "JPEG" 502 of the option "File Format" differentially displayed on the option setting screen, the controller 140 compares a priority given to the detected conflicting option "JPEG" of the option "File Format" with a priority given to the option "Mono" 501 of the option "Color Mode" that is impossible to be set simultaneously with the detected conflicting option "JPEG" 502 of the option "File Format".

If the priority of the conflicting option "JPEG" 502 of the option "File Format" is high, the controller 140 automatically sets the conflicting option "JPEG" 502 of the option "File Format" as an option 503 related to the job of the image forming apparatus 100 as illustrated in FIG. 5C.

The controller 140 controls the display device 120 to display information "Color mode was changed to Color to Support JPEG mode" 504 about the automatic setting.

if the user selects the conflicting option "JPEG" 502 that is differentially displayed, the controller 140 performs an operation corresponding to the second mode but is not limited thereto. Therefore, according to an exemplary embodiment, the controller 140 may automatically set an option having a high priority based on a priority comparison result as an option related to the job of the image forming apparatus 100 without an operation of differentially displaying a detected conflicting option and an operation of selecting the displayed conflicting option as illustrated in FIG. 5B.

<#3: Third Mode>

An option to be used for the job of the image forming apparatus 100 is selected on the option setting screen for the job of the image forming apparatus 100 displayed on the display device 120. Selections of a plurality of options for the job of the image forming apparatus 100 may be performed through a user input on the option setting screen. An option set to a default option may be automatically option for the job of the image forming apparatus 100.

The controller 140 detects a conflicting option that is impossible to be set simultaneously with the plurality of selected options, by using the information stored in the storage device 110. If a conflicting option is detected, the controller 140 controls the display device 120 to display the detected conflicting option differentially from the plurality of options displayed on the option setting screen of the display device 120.

If the user selects the conflicting option that is differentially displayed, on the option setting screen, the controller 140 controls the display device 120 to display an option list UI window including a replaceable option in an option that is impossible to be set simultaneously with the conflicting option, in an area of the option setting screen. The option list UI window may be displayed in a pop-up form in the area of the option setting screen. The option list UI window may display a replaceable second option together in a first option that is impossible to set simultaneously with a conflicting option and display an identifier indicating that the second option is a replaceable option in the second option.

If a replaceable option is selected on the option list UI window, the controller 140 sets the selected replaceable option and a conflicting option as options related to the job of the image forming apparatus 100. The controller 140 controls the display device 120 to display information about option setting.

The controller 140 controls the display device 120 to change a conflicting option, which is displayed in a disable state on the option setting screen, into an enable state and display the conflicting option changed into the enable state.

According to the third mode, if conflicts occur between a plurality of selected options, a replaceable option is selected on an option list UI window displayed on an option setting screen to easily set an option without moving onto the option setting screen displaying the replaceable option.

The third mode is described in detail with reference to FIGS. 6A-6C and FIGS. 7A-7D.

Figure 6A:
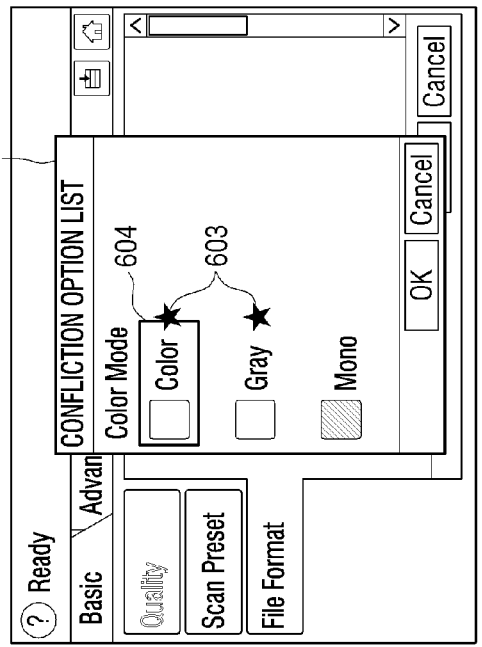
FIGS. 6A-6C and 7A-7D illustrate UIs displaying operations of the image forming apparatus if a third mode for processing a conflicting option according to a user selection is selected, according to an exemplary embodiment of the present invention.
Figure 6B:
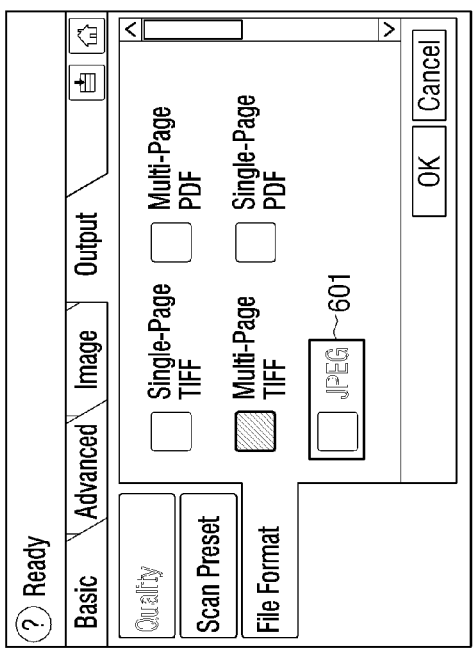
Figure 6C:
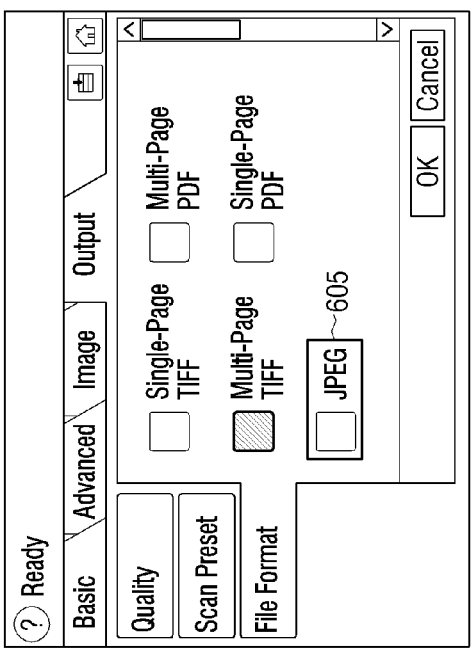

FIGS. 6A-6C are views illustrating a UI displaying an operation of the image forming apparatus 100 if the third mode for processing a conflicting option according to a user selection is selected, according to an exemplary embodiment of the present invention.

If an option "Mono" of an option "Color Mode" is selected, the controller 140 detects an option "JPEG" of an option "File Format" as a conflicting option that is impossible to be set simultaneously the option "Mono" of the option "Color Mode" by using the information stored in the storage device 110. The controller 140 controls the display device 120 to differentially display a conflicting option "JPEG" 601 (e.g., a disable state) of the option "File Format" as illustrated in FIG. 6A.

If the user selects the conflicting option "JPEG" 601 of the option "File Format" differentially displayed on the option setting screen, the controller 140 controls the display device 120 to display an option list UI window 602, including an option "Mono" of an option "Color Mode" that is impossible to be set simultaneously with the conflicting option, a replaceable option "Color" of the option "Color Mode" replacing the option "Mono" of the option "Color Mode", and an option "Gray" of the option "Color Mode", in an area of the option setting screen as illustrated in FIG. 6B. As illustrated in FIG. 6B, the option list UI window may be displayed as a pop-up window form, and an identifier 630 indicating that the replaceable option "Color" of the option "Color Mode" and the option "Gray" of the option "Color Mode" are replaceable options may be displayed.

If the replaceable "color option of color mode" 603 is selected on the option list UI window 602, the controller 140 sets the selected "color option of color mode" 603 and the conflicting option "JPEG Option of File Format" 601 as options related to the job of the image forming apparatus 100. The controller 140 controls the display device 120 to display information "Color mode was changed to Color to Support JPEG mode" about option setting. As illustrated in FIG. 6C, the controller 140 controls the display device 120 to change the conflicting option "JPEG Option of File Formation" 601 displayed in a disable state into an enable state 605 and display the conflicting option "JPEG Option of File Formation" 601 changed into the enable state 605.

FIGS. 7A-7D are views illustrating a UI displaying an operation of the image forming apparatus 100 if the third mode for processing a conflicting option according to a user selection, according to an exemplary embodiment of the present invention.

Figure 7A:
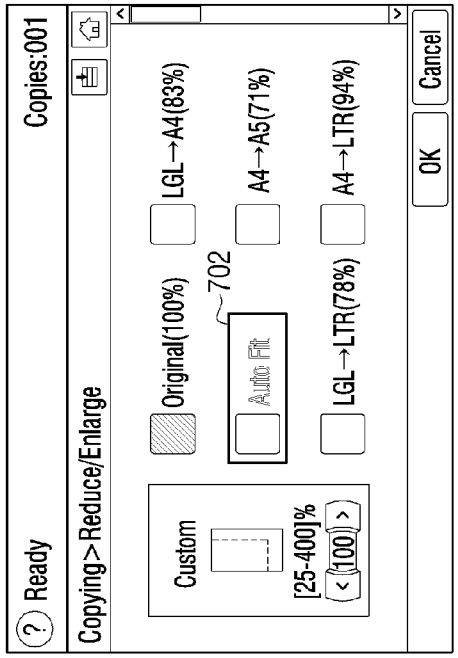
Figure 7B:
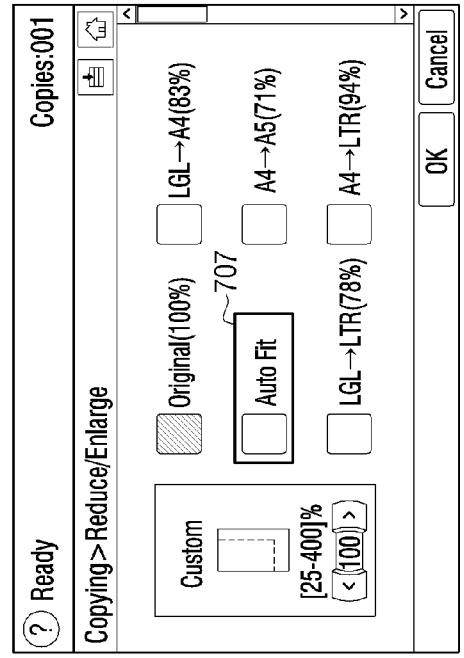

If an option an option "Left Page" of an option "Book Copy" and an option "Auto" of an option "Edge Erase" are selected, the controller 140 detects an option "Auto Fit" of an option "Reduce/Enlarge" as a conflicting option that is impossible to be set simultaneously with the option "Left Page" of the option "Book Copy" and the option "Auto" of the option "Edge Erase" by using the information stored in the storage device 110. If an option 701 related to the option "Reduce/Enlarge" is selected on an option setting screen of FIG. 7A, the controller 140 controls the display device 120 to differentially display an option "Auto Fit" 702 (e.g., a disable state) of the conflicting option "Reduce/Enlarge" as illustrated in FIG. 7B.

Figure 7C:
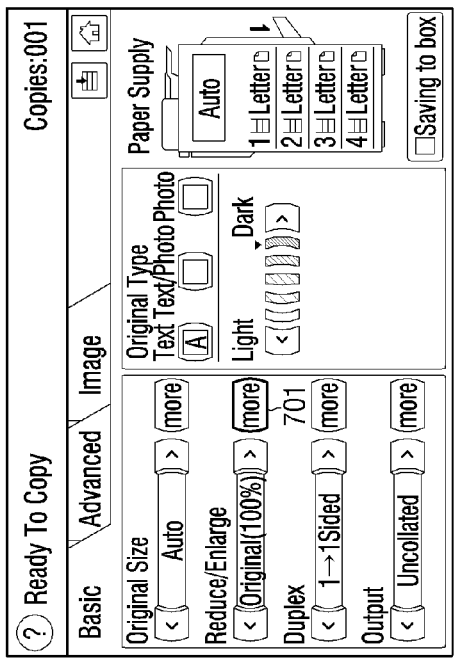

If the user selects the option "Auto Fit" 702 of the conflicting option "Reduce/Enlarge" differentially displayed on the option setting screen, the controller 140 controls the display device 120 to display an option list UI window 703 in an area of the option setting screen. The option list UI window 703 displays the option "Left Page" of the option "Book Copy" that is impossible to be set simultaneously with the option "Auto Fit" 702 of the conflicting option "Reduce/Enlarge", an option "Right Page" of the option "Book Copy", an option "Both Page" of the option "Book Copy", and a replaceable option "Off" of the option "Book Copy" replacing the option "Left Page" of the option "Book Copy" in an area thereof. The option list UI window 703 displays an option "Auto" of "Edge Erase" that is impossible to be set simultaneously with the option "Auto Fit" 702 of the conflicting option "Reduce/Enlarge", an option "Enhance" of "Edge Erase", an option "Erase" of "Edge Erase", and a replaceable option "Off" of "Edge Erase" in the option "Auto" of "Edge Erase" in an other area thereof. As illustrated in FIG. 7C, the option list UI window 703 may be displayed in a pop-up window form, and an identifier 704 indicating a replaceable option may be displayed in the replaceable option.

Figure 7D:
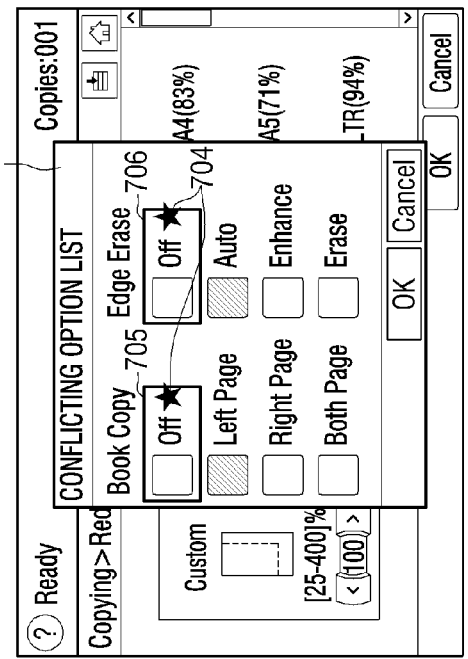

If replaceable options 705 and 706 are selected on the option list UI window 703, the controller 140 sets the selected replaceable options 705 and 706 and the conflicting option "Auto Fit" 702 as options related to the job of the image forming apparatus 100. In this case, the controller 140 controls the display device 120 to display information "Color mode was changed to Color to Support JPEG mode" about option setting. The controller 140 controls the display device 120 to change the conflicting option "Auto Fit" 702 displayed in a disable state on the option setting screen into an enable state 707 and display the conflicting option "Auto Fit" 702 changed into the enable state 707 as illustrated in FIG. 7D.

<#4: Fourth Mode>

If an option to be used for the job of the image forming apparatus 100 is selected on an option setting screen for the job of the image forming apparatus 100 displayed on the display device 120. Selections of a plurality of options for the job of the image forming apparatus 100 may be performed through a user input on the option setting screen. Alternatively, an option set to a default option may be automatically selected as an option for the job of the image forming apparatus 100.

The controller 140 detects a conflicting option that is impossible to be set simultaneously with a plurality of selected options, by using the information stored in the storage device 110.

If the conflicting option that is impossible to be set simultaneously with the plurality of selected options is detected, the controller 140 determines whether an option that is impossible to be set simultaneously with the detected conflicting option is a default option.

If it is determined that the option is the default option, the controller 140 controls the overall operation of the image forming apparatus 100 so that the image forming apparatus 100 operates in the second mode.

Figure 8A:
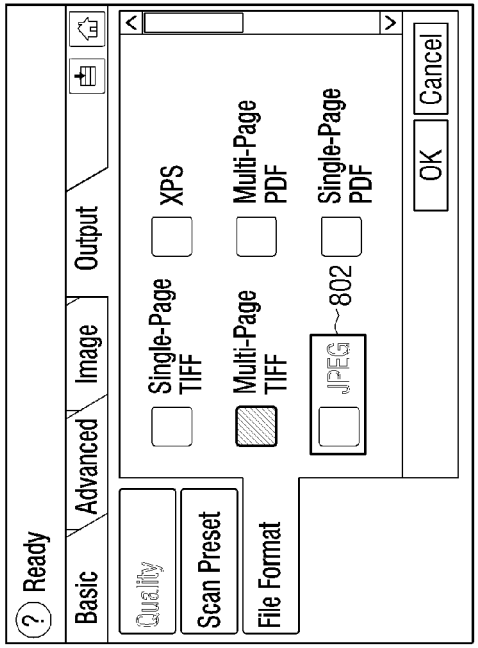
FIGS. 8A-8C and 9A-9D illustrate UIs displaying operations of the image forming apparatus if a fourth mode for processing a conflicting option by using the second or third mode according to a preset standard is selected, according to an exemplary embodiment of the present invention.
Figure 8B:
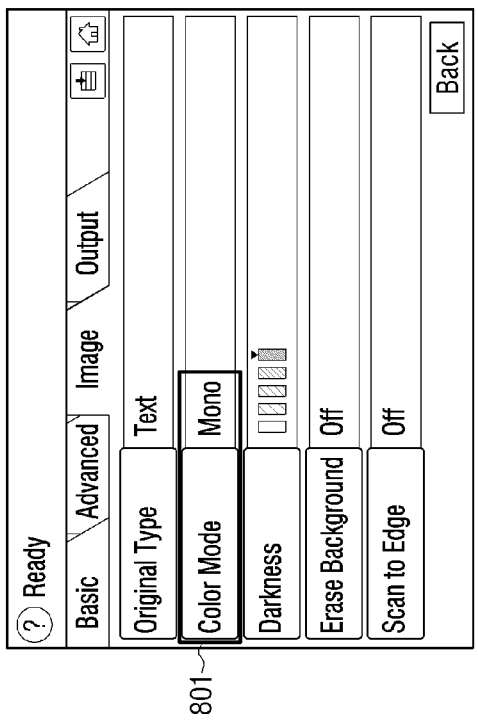
Figure 8C:
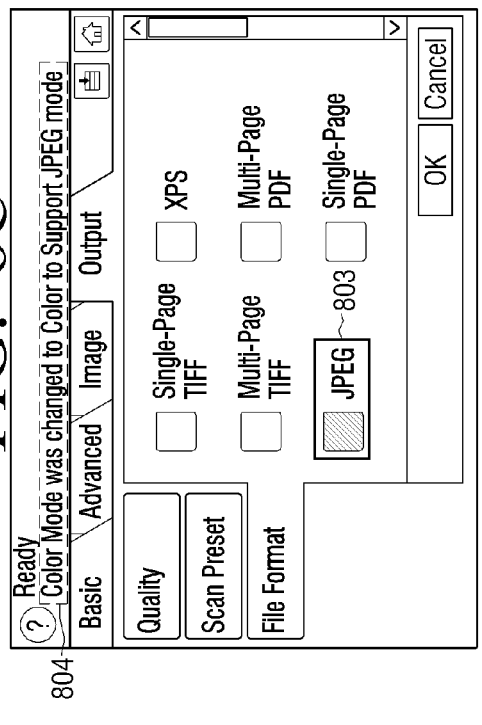

FIGS. 8A through 8C are described in detail.

FIGS. 8A-8C are views illustrating a UI displaying an operation of the image forming apparatus 100 if the fourth mode is selected, according to an exemplary embodiment of the present invention.

If a conflicting option "JPEG" of an option "File Format" that is impossible to be set simultaneously with a plurality of selected options is detected, the controller 140 determines whether an option "Mono" of an option "Color mode" that is impossible to be set simultaneously with the conflicting option "JPEG" of the option "File Format" is a default option.

If an option "Mono" 801 of the option "Color Mode" is a default option that is automatically selected without a selection of the user as illustrated in FIG. 8A, the controller 140 controls the overall operation of the image forming apparatus 100 so that operates in the second mode.

In other words, the controller 140 controls the display device 120 to differentially display a conflicting option "JPEG" 802 of the option "File Format" (e.g., a disable state) as illustrated in FIG. 8B.

If the user selects the conflicting option "JPEG" 802 of the option "File Format" differentially displayed on the option setting screen, the controller 140 compares a priority given to the detected conflicting option "JPEG" 802 of the option "File Format" with a priority given to the option "Mono" 801 of the option "Color Mode" that is impossible to be set simultaneously with the detected conflicting option "JPEG" 802 of "File Format".

If the priority of the conflicting option "JPEG" 802 of the option "File Format" is high, the controller 140 automatically sets the conflicting option "JPEG" 802 of the option "File Format" as an option 803 related to the job of the image forming apparatus 100.

The controller 140 controls the display device 120 to display information "Color mode was changed to Color to Support JPEG mode" 804 about the automatic setting.

If it is determined that the option is not the default option, the controller 140 controls the overall operation of the image forming apparatus 100 so that the image forming apparatus 100 operates in the third mode.

FIGS. 9A through 9D are described.

FIGS. 9A-9D are views illustrating a UI displaying an operation of the image forming apparatus 100 if the fourth mode is selected, according to an exemplary embodiment of the present invention.

If a conflicting option "JPEG" of an option "File Format" that is impossible to be set simultaneously with a plurality of selected options is detected, the controller 140 determines whether an option "Mono" of an option "Color Mode" that is impossible to be set simultaneously with the detected conflicting option "JPEG" of the option "File Format" is a default option.

Figure 9A:
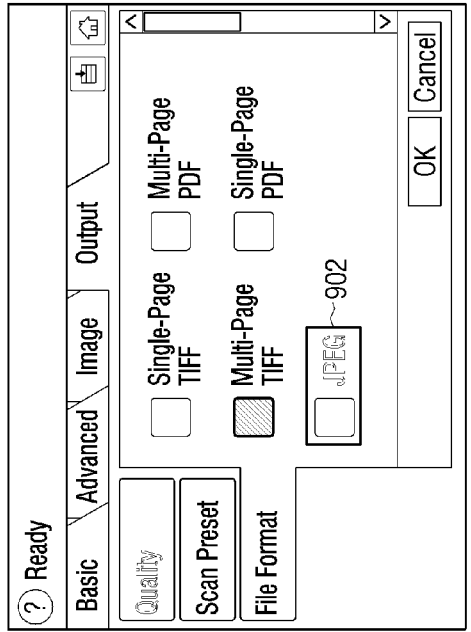

If an option "Mono" 901 of the option "Color Mode" is a user selection option selected through an input of the user on an option setting screen as illustrated in FIG. 9A, the controller 140 controls the overall operation of the image forming apparatus 100 so that the image forming apparatus 100 operates in the third mode.

Figure 9B:
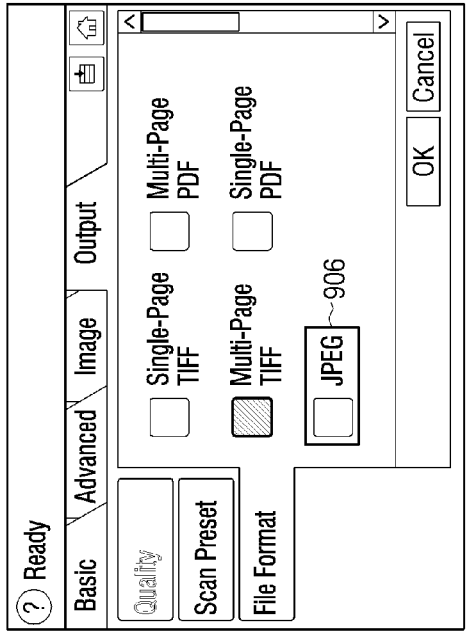

In other words, the controller 140 controls the display device 120 to differentially display a conflicting option "JPEG" 902 of the option "File Format" (e.g., a disable state) as illustrated in FIG. 9B.

Figure 9C:
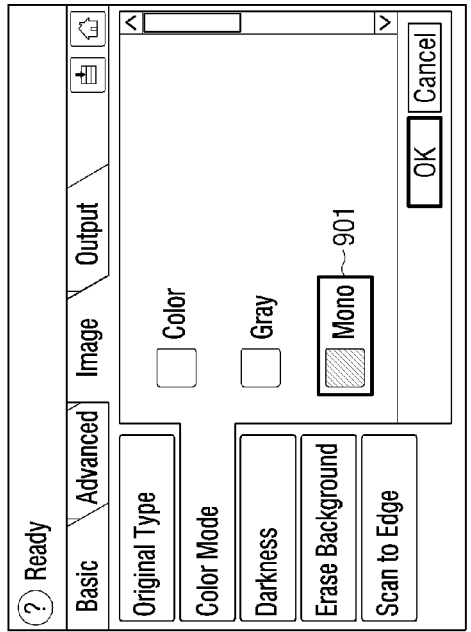

If the user selects the conflicting option "JPEG" 902 of the option "File Format" differentially displayed on the option setting screen, the controller 140 controls the display device 120 to display an option list UI window 903 in an area of the option setting screen as illustrated in FIG. 9C. The option list UI window 903 includes an option "Mono" of the option "Color Mode" that is impossible to be set simultaneously with the conflicting option, a replaceable option "Color" of "Color Mode" replacing the option "Mono" of the "Color Mode", and an option "Gray" of the "Color Mode". As illustrated in FIG. 9C, the option list UI window 903 may be displayed in a pop-up window form, and identifiers 904 indicating the replaceable option "Color" of the option "Color Mode" and the option "Gray" of the option "Color Mode" may be displayed.

Figure 9D:
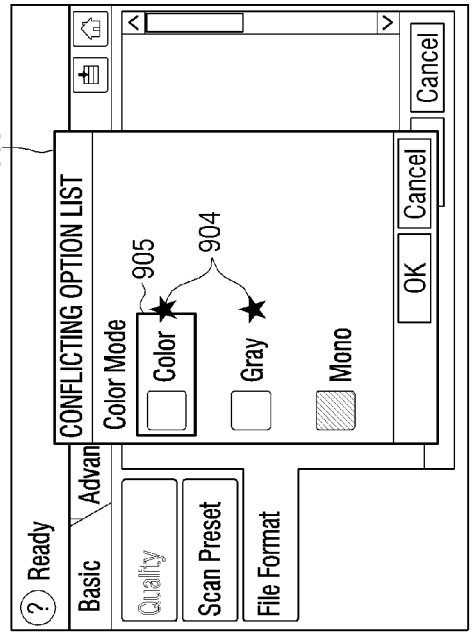

If the replaceable option "Color" 905 of the option "Color Mode" is selected on the option list UI window 902, the controller 140 sets the selected option "Color" 905 of the option "Color Mode" and the conflicting option "JPEG" 902 of the option "File Format" as options related to the job of the image forming apparatus 100. The controller 140 controls the display device 120 to display information "Color mode was changed to Color to Support JPEG mode" about option setting. The controller 140 controls the display device 120 to change the conflicting option "JPEG" 902 of the option "File Format" displayed in a disable state on the option setting screen into an enable state 906 and display the conflicting option "JPEG" 902 of the option "File Format" changed into the enable state as illustrated in FIG. 9D.

According to the fourth mode, an advantage of the second mode and an advantage of the third mode may be combined and provided.

Figure 2:
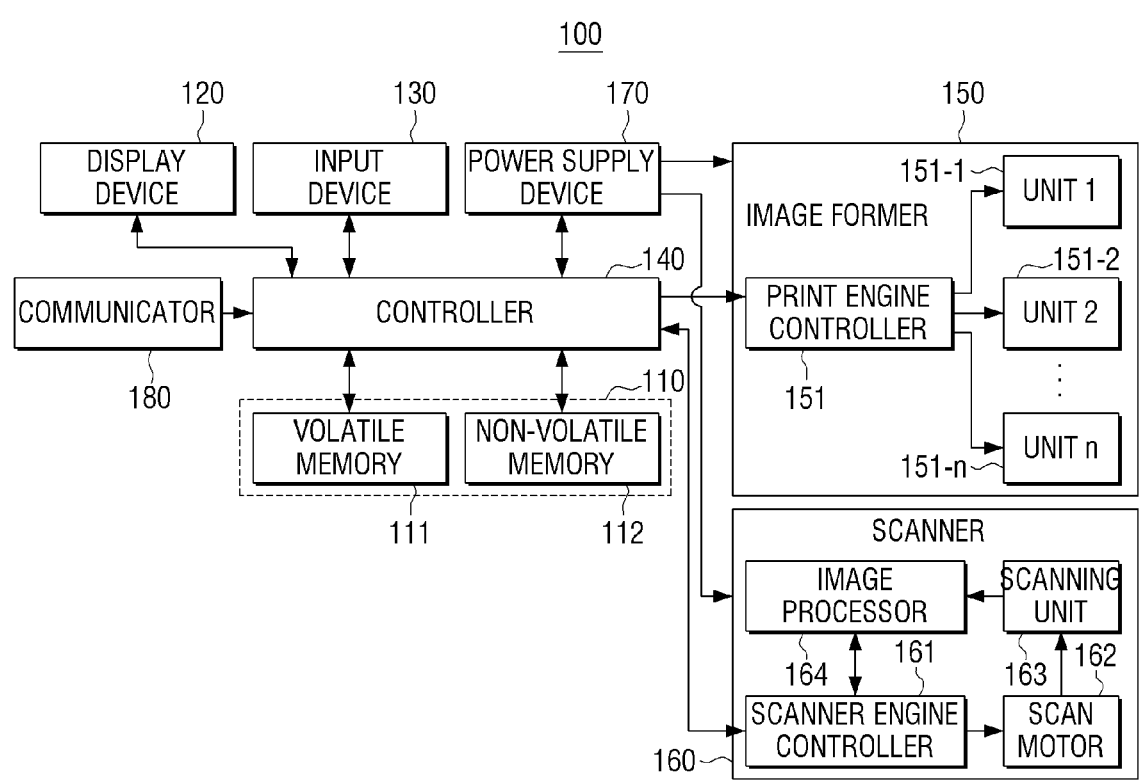
FIG. 2 illustrates an exemplary image forming apparatus.

FIG. 2 is a detailed block diagram illustrating an image forming apparatus 100, for example, of FIG. 1. Referring to FIG. 2, the image forming apparatus 100 includes all or some of the storage device 110, the display device 120, the input device 130, the controller 140, an image former 150, a scanner 160, a power supply device 170, and a communicator 180. The image forming apparatus 100 of FIG. 2 may be function as an MFP that performs at least two or more of printing, scanning, copying, and faxing functions. If the image forming apparatus 100 is a printer, some elements including the scanner 160 may be omitted. Elements (not shown), such as a bus for exchanging data between elements, a buffer for temporarily storing data, etc., may be included.

The input device 130 receives various types of selection commands from the user. The input device 130 receives a user input for a UI screen. The input device 130 receives commands that are to set various functions of the image forming apparatus 100, changes modes, and set stopping and resuming of an operation.

The power supply device 170 supplies power to elements of the image forming apparatus 100. The power supply device 170 receives commercial alternating current (AC) power AC_IN from an external source, convert the commercial AC power AC_IN into direct current (DC) power DC_OUT having a potential level appropriate for the elements by using devices such as a transformer, an inverter, a rectifier, etc., and outputs the DC power DC_OUT.

The controller 140 performs functions, for example, as described with reference to FIG. 1. The controller 140 controls the elements of the image forming apparatus 100 according to data and a command received from an external device connected through the communicator 180, a user selection command input through the input device 130, etc.

The image former 150 includes print engine controller 151 and a plurality of units 151-1 through 151-$n$ used for an image forming job. The units 151-1 through 151-$n$ may include a paper feeder, a charger, an exposer, a photoreceptor, a plurality of developers, a transfer, a fixing unit, a discharging unit, etc. The print engine controller 151 controls the units 151-1 through 151-$n$ to perform the image forming job under control of the controller 140.

If a scan command is input through the input device 110, the controller 140 controls the scanner 160 to perform a scanning job.

The scanner 160 includes a scanner engine controller 161, a scan motor 162, a scanning unit 163, and an image processor 164.

The scanner engine controller 161 communicates with the controller 140 to control elements of the scanner 160 so as to perform the scanning job.

The scanning unit 163 scans an object. The scanning unit 163 may include an image reading sensor, a lens, and a light source. The image sensor may be a charge-coupled device (CCD) image sensor or a complementary metal oxide semiconductor (CMOS) image sensor (CIS). The image reading sensor includes a photoelectric transducer (not shown) and a signal detector (not shown). The photoelectric transducer absorbs reflected light of light emitted from the light source and irradiated onto an object to generate a charge. The signal detector detects the charges generated by the photoelectric transducer and converts the charge into an electrical signal. The electrical signal converted by the signal detector is provided to the image processor 164.

The image processor 164 performs processing, such as shading, a gamma correction, a Dot-Per-Inch (DPI) conversion, an edge emphasis, an error diffusion, scaling, etc., with respect to image data input from the scanning unit 163 to generate scanned data. The image data is appropriately processed in consideration of a resolution, a scan mode, a scan area, and enlarging and reducing ratios, etc. that are pre-designated.

The scan motor 162 moves the scanning unit 163 or a paper sheet to scan a whole part of the object. In other words, the scan motor 162 moves different media according to whether an operating method of a scanner is a sheet feed method or a flatbed method. For example, if the operating method of the scanner is the sheet feed method, the scan motor 162 moves the paper sheet. If the operating method of the scanner is the flatbed method, the scanning unit 163 moves the scanning unit 163. The scan motor 162 may be realized as a carriage return motor or the like.

If a scan command is transmitted from the controller 140, the scanner engine controller 161 drives the scanning unit 163 and the scan motor 162 to scan the object and controls the image processor 164 to generate the scanned data.

The storage device 110 stores various types of information such a spec, a used state, printing data, scanned data, pre-processed data, printing history information, etc. of the image forming apparatus 100 and various types of application programs and operating systems (O/Ss) used in the image forming apparatus 100. The storage device 110 includes a volatile memory 111 and a non-volatile memory 112.

The volatile memory 111 may be used a temporal storage space necessary for an operation of the image forming apparatus 100. In other words, printing data, pre-scanned data, scanned data for coping, etc. transmitted from a host personal computer (PC) may be temporarily stored in the volatile memory 111 and then may be discarded after a corresponding job is completed. The non-volatile memory 112 may store various types of data or programs. One volatile memory 111 and one non-volatile memory 112 are illustrated in FIG. 2, but the number and sizes of volatile memory 111 and non-volatile memory 112 may be vary according to a characteristic of the image forming apparatus 100.

Figure 10:
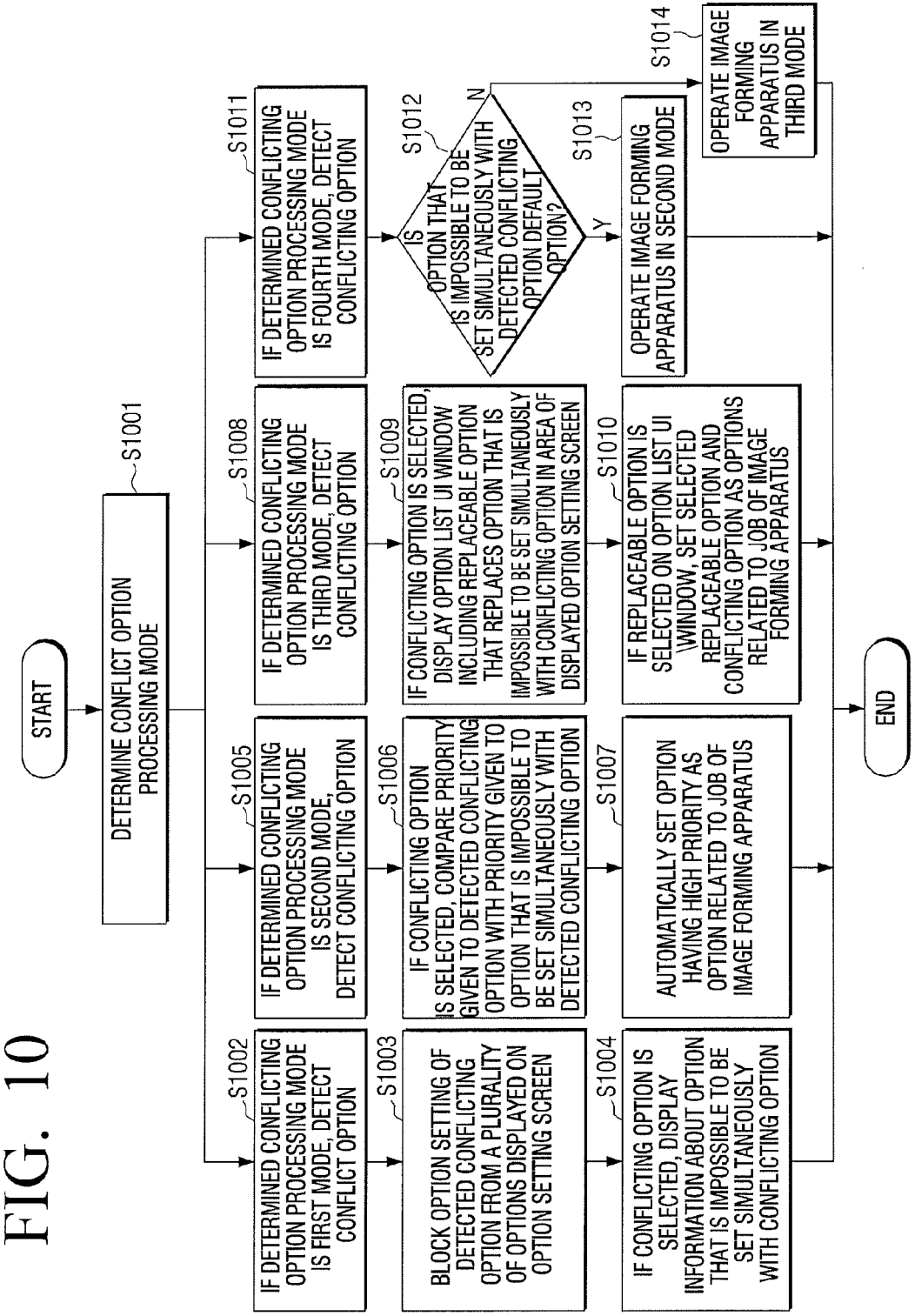
FIG. 10 illustrates a method of controlling an image forming apparatus according to an exemplary embodiment of the present invention.

FIG. 10 is a flowchart illustrating a method of controlling an image forming apparatus according to an exemplary embodiment of the present invention. Referring to FIG. 10, in operation S1001, a selected conflicting option processing mode is determined. If it is determined in operation S1001 that the selected conflicting option processing mode is a first mode, a conflicting option that is impossible to be set simultaneously with a plurality of selected portions is detected in operation S1002. In operation S1003, option setting of the detected conflicting option is blocked from a plurality of options displayed on an option setting screen. If the conflicting option is selected, information about an option that is impossible to be set simultaneously with the conflicting option is displayed in operation S1004.

If it is determined in operation S1001 that the selected conflicting option processing mode is a second mode, a conflicting option that is impossible to be set simultaneously with the plurality of selected options is detected in operation S1005. If the conflicting option is selected, a priority given to the detected conflicting option is compared with a priority given to an option that is impossible to be set simultaneously with the detected conflicting option in operation S1006. An option having a high priority is automatically set as an option related to a job of the image forming apparatus 100 based on the result of the priority comparison in operation S1007.

If it is determined in operation S1001 that the selected conflicting option processing mode is a third mode, a conflicting option that is impossible to be set simultaneously with the plurality of selected options is detected in operation S1008. If the conflicting option is selected, an option list UI window including a replaceable option in the option that is impossible to be set simultaneously with the conflicting option is displayed in an area of the option setting screen in operation S1009. If the replaceable option is selected on the option list UI window, the selected replaceable option and conflicting option are set as options related to the job of the image forming apparatus 100 in operation S1010.

If it is determined in operation S1001 that the selected conflicting option processing mode is a fourth mode, a conflicting option that is impossible to be set simultaneously with the plurality of selected options is detected in operation S1011. If the conflicting option is detected, a determination is made as to whether an option that is impossible to be set simultaneously with the detected conflicting option is a default option in operation S1012. If it is determined in operation S102 that the option is the default option, the image forming apparatus 100 operates in the second mode in operation S1013. If it is determined in operation S1012 that the option is the default option, the image forming apparatus operates in the third mode in operation S1014.

FIG. 11 is a flowchart illustrating a method of controlling an image forming apparatus according to an exemplary embodiment of the present invention.

In operation S1101, the display device 120 displays an option setting screen for a job of the image forming apparatus 100.

In operation S1102, the controller 140 detects options that are impossible to be set simultaneously from a plurality of options selected on the displayed option setting screen. The controller 140 detects the options that are impossible to be simultaneously set from the plurality of selected options by using the information stored in the storage device 110.

If a job performing command of the image forming apparatus is input, the controller 140 controls the display device 120 to display an option list UI window in an area of the option setting screen in operation S1103. The option list UI window includes the options that are impossible to be simultaneously set and selects replaceable options for the detected options that are impossible to be simultaneously set.

The job performing command may be input by touching a job performing mechanical button disposed on a side of the image forming apparatus 100 or a job performing screen displayed in an area of a UI screen.

FIGS. 12A through 12D are described.

FIGS. 12A through 12D are views illustrating an operation of the image forming apparatus 100 according to an exemplary embodiment of the present invention.

Figure 12A:
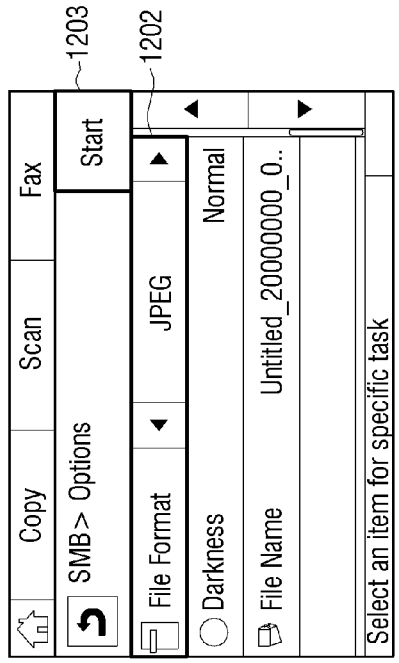
FIGS. 12A-12D illustrate a UI displaying an operation of an image forming apparatus according to an exemplary embodiment of the present invention.
Figure 12B:
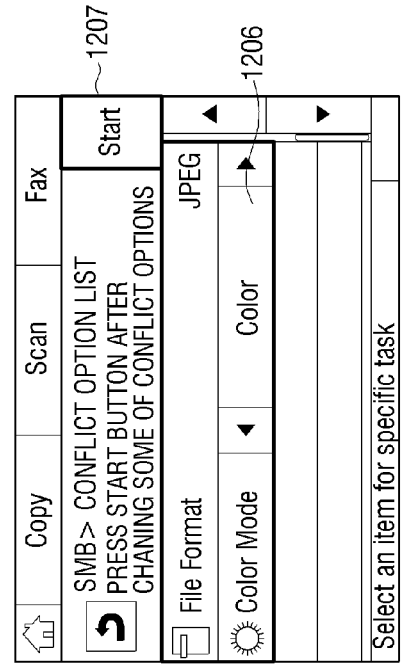

As illustrated in FIGS. 12A and 12B, the display device 120 displays an option setting screen for a job of the image forming apparatus 100. In this case, a user selects at least one of an option "Mono" 1201 of an option "Color Mode" and an option "JPEG" 1202 of an option "File Format". Alternatively, at least one of the option "Mono" 1201 of the option "Color Mode" and the option "JPEG" 1202 of the option "File Format" may be automatically set to a default option.

The controller 140 detects the option "Mono" 1201 of the option "Color Mode" and the option "JPEG" 1202 of the option "File Format" that are impossible to be simultaneously set from a plurality of selected options.

Figure 12C:
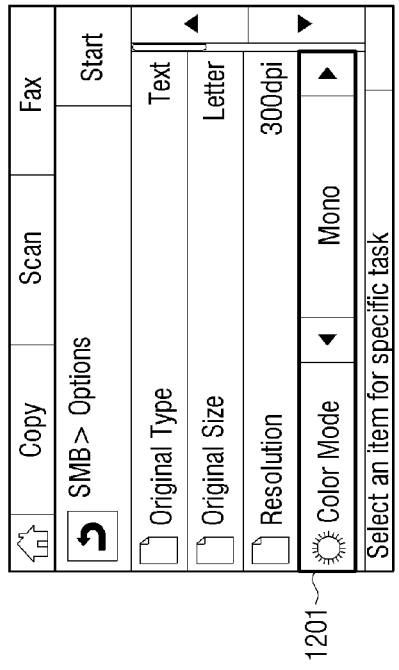

If the user inputs a job performing command 1203 of the image forming apparatus 100 in this state, the controller 140 controls the display device 120 to display an option list UI window 1204 in an area of the option setting screen as illustrated in FIG. 12C. The option list UI window 1204 includes the option "Mono" 1201 of the "Color Mode" and the option "JPEG" 1202 of the "File Format" that are impossible to be simultaneously set and selects replaceable options respectively for the detected options that are impossible to be simultaneously set.

The controller 140 controls the display device 120 to display information "Press start button after changing some of conflicting options" about that the plurality of selected options include the options that are impossible to be simultaneously set as illustrated in FIG. 12C.

Figure 12D:
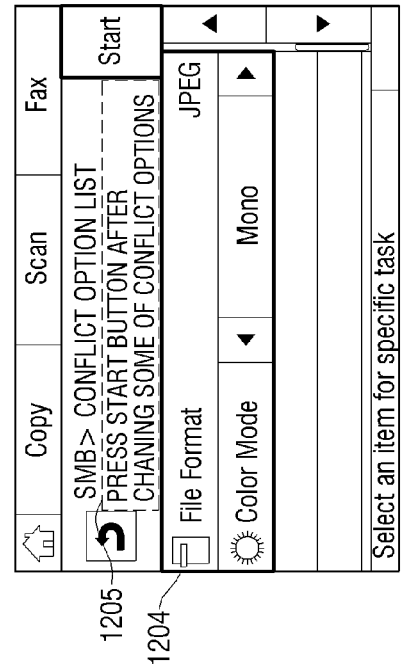

As illustrated in FIG. 12D, the user selects an option "Color" 1206 of the option "Color Mode" that may replace the option "Mono" 1201 of the option "Color Mode" on the option list UI window 1204 to perform a job. If the user inputs a job performing command 1207, the user performs the job by using the image forming apparatus 100.

According to an exemplary embodiment of the present invention, if conflicts occur between a plurality of selection options, a replaceable option may be selected on an option list UI window to easily set an option without moving an option setting screen that displays the replaceable options.

A method of controlling an image forming apparatus according to various exemplary embodiments of the present invention may be program code stored on a non-transitory computer-readable medium to be provided, for example, to servers or apparatuses.

The non-transitory computer readable medium refers to a medium, which does not store data for a short time such as a register, a cache memory, a memory, or the like, but semi-permanently stores data and is readable by a device. The above-described applications or programs may be stored and provided on a non-transitory computer readable medium such as a CD, a DVD, a hard disk, a blue-ray disk, a universal serial bus (USB), a memory card, a ROM, or the like.

The foregoing exemplary embodiments and advantages are merely exemplary and are not to be construed as limiting. The present teaching can be applied to other types of apparatuses. The description of the exemplary embodiments is intended to be illustrative, and not to limit the scope of the claims, and many alternatives, modifications, and variations will be apparent to those skilled in the art.

What is claimed is:

1. A method of controlling an image forming apparatus, the method comprising:
displaying an option setting screen for a job of the image forming apparatus;
selecting at least one option on the option setting screen;
if the selected at least one option is a conflicting option that is impossible to be set simultaneously with at least one of a plurality of options that are pre-selected for the job of the image forming apparatus, displaying an option list user interface (UI) window in an area of the displayed option setting screen; and
displaying a screen for selecting a conflicting option processing mode of the image forming apparatus,
wherein the option list UI window comprises a replaceable option that is to replace a pre-selected option conflicting with the conflicting option, and
wherein the conflicting option processing mode comprises a first mode for processing the conflicting option based on a selected order, a second mode for processing the conflicting option according to priorities given to options, a third mode for processing the conflicting option according to a user selection, and a fourth mode for processing the conflicting option by using the second or third mode based on a preset standard.

2. The method of claim 1, further comprising:
detecting the conflicting option that is impossible to be set simultaneously with the plurality of options pre-selected for the job of the image forming apparatus;
wherein the displaying of the option setting screen comprises differentially displaying the detected conflicting option from the plurality of options displayed on the option setting screen.

3. The method of claim 1, wherein:
the option list UI window displays the pre-selected option conflicting with the conflicting option and the replaceable option replacing the pre-selected option together; and
the replaceable option displays an identifier indicating the replaceable option.

4. The method of claim 1, wherein the option list UI window is displayed in the area of the option setting screen displayed in a pop-up window form.

5. The method of claim 2 further comprising:
if the replaceable option is selected on the option list UI window, setting the selected replaceable option and the conflicting option as options related to the job of the image forming apparatus.

6. The method of claim 1, if the selected conflicting option processing mode is the first mode, further comprising:
if the conflicting option that is impossible to be set simultaneously with the plurality of options pre-selected for the job of the image forming apparatus is detected, blocking an option setting of the detected conflicting option from the plurality of options displayed on the option setting screen; and
if the conflicting option is selected, displaying information about the pre-selected option conflicting with the conflicting option.

7. The method of claim 1, if the selected conflicting option processing mode is the second mode, further comprising:
if the conflicting option that is impossible to be set simultaneously with the plurality of options pre-selected for the job of the image forming apparatus is detected, comparing a priority given to the detected conflicting option with a priority given to the pre-selected option conflicting with the detected conflicting option; and
automatically setting an option having a high priority as an option related to the job of the image forming apparatus based on a result of the priority comparison.

8. The method of claim 1, wherein if the selected conflicting option processing mode is the third mode, the method of any one of claims 1 through 5 is performed.

9. The method of claim 1, if the selected conflicting option processing mode is the fourth mode, further comprising:
- if the conflicting option that is impossible to be set simultaneously with the plurality of options pre-selected for the job of the image forming apparatus is detected, determining whether the pre-selected option conflicting with the detected conflicting option is a default option; and
- if it is determined that the pre-selected option is the default option, operating the image forming apparatus in the second mode, and if it is determined that the pre-selected option is not the default option, operating the image forming apparatus in the third mode.

10. An image forming apparatus comprising:
- a display device that displays an option setting screen for a job of the image forming apparatus;
- an input device that receives a user input for selecting at least one option on the option setting screen; and
- a controller that, if the selected at least one option is a conflicting option that is impossible to be set simultaneously with a plurality of options pre-selected for the job of the image forming apparatus, controls the display device to display an option list UI window in an area of the displayed option setting screen, wherein the option list UI window comprises a replaceable option that replaces a pre-selected option conflicting with the conflicting option,
- wherein the display device displays a screen for selecting a conflicting option processing mode of the image forming apparatus, and
- wherein the conflicting option processing mode comprises a first mode for processing the conflicting option based on a selected order, a second mode for processing the conflicting option according to priorities given to options, a third mode for processing the conflicting option according to a user selection, and a fourth mode for processing the conflicting option by using the second or third mode based on a preset standard.

11. The image forming apparatus of claim 10, further comprising:
- a storage device that stores information about options that are impossible to be set simultaneously with the plurality of options pre-selected for the job of the image forming apparatus,
- wherein the controller controls the display device to detect the conflicting option that is impossible to be set simultaneously with the plurality of options pre-selected for the job of the image forming apparatus, by using the information stored in the storage device and differentially display the detected conflicting option from the plurality of options displayed on the option setting screen.

12. The image forming apparatus of claim 10, wherein:
- the option list UI window displays the pre-selected option conflicting with the conflicting option and the replaceable option replacing the pre-selected option together; and
- the replaceable option displays an identifier indicating the replaceable option.

13. The image forming apparatus of claim 10, wherein the option list UI window is displayed in the area of the option setting screen displayed in a pop-up window form.

14. The image forming apparatus of claim 11, wherein if the replaceable option is selected on the option list UI window, the controller sets the selected replaceable option and the conflicting option as options related to the job of the image forming apparatus.

15. The image forming apparatus of claim 10, wherein if the selected conflicting option processing mode is the first mode, and the conflicting option that is impossible to be set simultaneously with the plurality of options pre-selected for the job of the image forming apparatus is detected, the controller controls the display device to block option setting of the detected conflicting option from the plurality of options displayed on the option setting screen, and if the conflicting option is selected, display information about the pre-selected option conflicting with the conflicting option.

16. The image forming apparatus of claim 10, wherein if the selected conflicting option processing mode is the second mode, and the conflicting option that is impossible to be set simultaneously with the plurality of options pre-selected for the job of the image forming apparatus is detected, the controller compares a priority given to the detected conflicting option with a priority given to the pre-selected option conflicting with the detected conflicting option and automatically sets an option having a high priority as an option related to the job of the image forming apparatus based on a result of the priority comparison.

17. The image forming apparatus of claim 10, wherein if the selected conflicting option processing mode is the fourth mode, and the conflicting option that is impossible to be set simultaneously with the plurality of options pre-selected for the job of the image forming apparatus is detected, the controller controls to determine whether the pre-selected option conflicting with the detected conflicting option is a default option, if it is determined that the pre-selected option is the default option, operate the image forming apparatus in the second mode, and, if it is determined that the pre-selected option is not the default option, operate the image forming apparatus in the third mode.

18. A method of controlling an image forming apparatus, the method comprising:
- displaying an option setting screen for a job of the image forming apparatus;
- detecting at least one conflicting option that is impossible to be set simultaneously with a plurality of selected options;
- displaying a screen for selecting a conflicting option processing mode of the image forming apparatus; and
- if a job performing command of the image forming apparatus is input, displaying an option list UI window in an area of the displayed option setting screen,
- wherein the option list UI window comprises the detected at least one conflicting option that is impossible to be simultaneously set and selects replaceable options that respectively replace the at least one detected conflicting option,
- wherein the conflicting option processing mode comprises a first mode for processing the conflicting option based on a selected order, a second mode for processing the conflicting option according to priorities given to options, a third mode for processing the conflicting option according to a user selection, and a fourth mode for processing the conflicting option by using the second or third mode based on a preset standard.

* * * * *